US012688156B2

(12) United States Patent　　　　(10) Patent No.:　　US 12,688,156 B2

Venugopal et al.　　　　　　　　　　(45) Date of Patent:　　　　Jul. 21, 2026

(54) GARBAGE COLLECTION OF REDUNDANT PARTITIONS

(71) Applicant: INTERNATIONAL BUSINESS MACHINES CORPORATION, Armonk, NY (US)

(72) Inventors: Srikumar Venugopal, Dublin (IE); Stefano Braghin, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 541 days.

(21) Appl. No.: 17/483,984

(22) Filed: Sep. 24, 2021

(65)　　　　　　　Prior Publication Data

US 2023/0096276 A1　　　Mar. 30, 2023

(51) Int. Cl.
*G06F 16/17*　　　　　(2019.01)
(52) U.S. Cl.
CPC ................................ *G06F 16/1737* (2019.01)
(58) Field of Classification Search
CPC ............................ G06F 16/278; G06F 12/0253
See application file for complete search history.

(56)　　　　　　　References Cited

U.S. PATENT DOCUMENTS

| | | | |
|---|---|---|---|
| 8,346,820 | B2 | 1/2013 | Kesselman |
| 8,788,530 | B2 | 7/2014 | Lacapra |
| 9,020,901 | B2 | 4/2015 | Chi |
| 9,448,927 | B1 | 9/2016 | Agarwala |
| 10,254,998 | B2 | 4/2019 | Sinha |

| | | | | |
|---|---|---|---|---|
| 10,528,254 | B2 | 1/2020 | Bulkowski | |
| 10,558,565 | B2 | 2/2020 | Oltean | |
| 10,642,663 | B2 | 5/2020 | Harris | |
| 10,713,275 | B2 | 7/2020 | Merriman | |
| 11,216,316 | B1 * | 1/2022 | Sproat ................... | G06F 16/182 |
| 2007/0294480 | A1 * | 12/2007 | Moser ................... | G06F 12/123 |
| | | | | 711/E12.072 |
| 2012/0079484 | A1 * | 3/2012 | Shoolman ........... | H03M 7/3088 |
| | | | | 718/100 |
| 2015/0169442 | A1 * | 6/2015 | Fisher ................. | G06F 12/0253 |
| | | | | 711/103 |
| 2017/0277726 | A1 | 9/2017 | Huang | |
| 2018/0246903 | A1 * | 8/2018 | Frerking ............. | H04L 67/1004 |
| 2019/0227928 | A1 | 7/2019 | Mainali | |

(Continued)

OTHER PUBLICATIONS

Cook et al., "Partition selection policies in object database garbage collection", Department of Computer Science, Dec. 1993, University of Colorado at Boulder, 30 pages.

(Continued)

*Primary Examiner* — Scott A. Waldron
(74) *Attorney, Agent, or Firm* — Kimberly Zillig

(57)　　　　　　　ABSTRACT

A method, system, and computer program product for garbage collection of redundant partitions in distributed data management systems are provided. The method stores data across a set of nodes with the data being stored using one or more partitions and the data and the one or more partitions are replicated across the set of nodes. A first partition is determined to be stale at a first node of the set of nodes. The first partition is marked for deletion locally at the first node. A set of deletion votes are determined for the first partition with each node being associated with a deletion vote. The method determines a deletion decision for the first partition on the first node based on the set of deletion votes.

15 Claims, 6 Drawing Sheets

(56)                    References Cited

U.S. PATENT DOCUMENTS

2021/0216572 A1    7/2021  Braghin
2022/0138179 A1*   5/2022  Stone ................. G06F 16/2379
                                                 707/703

OTHER PUBLICATIONS

Idreos et al., "Design Continums and the Path Toward Self-Designing Key-Value Stores that Know and Learn", CIDR 2019, 9th Biennial Conference on Innovative Data Systems Research, Jan. 13-16, 2019, 14 pages.
Lamport, "Paxos Made Simple", Nov. 1, 2001, 14 pages.
Lamport, "The Part-Time Parliament", Digital Equipment Corporation, ACM Transactions on Computer Systems, vol. 16, No. 2, May 1998, 37 pages.
Maheshwari et al., "Partitioned Garbage Collection of a Large Object Store", Advanced Research Projects Agency of the Department of Defense, Oct. 1996, 14 pages.
Maheshwari, "Garbage Collection in a Large, Distributed Object Store", Doctoral Dissertation, Massachusetts Institute of Technology, Sep. 1997, 97 pages.
Mell et al., "The NIST Definition of Cloud Computing", Recommendations of the National Institute of Standards and Technology, NIST Special Publication 800-145, Sep. 2011, 7 pages.
Munroe et al., "Mosaic: A Non-intrusive Complete Garbage Collector for DSM Systems", IEEE, Conference Paper, Feb. 2001, 9 pages.
Ongaro et al., "In Search of an Understandable Consensus Algorithm", Proceedings of USENIX ATC '14: 2014 USENIX Annual Technical Conference, Jun. 19-20, 2014, 16 pages.
Ongaro et al., "The raft consensus algorithm", Stanford University, Oct. 2013, 26 pages.
Sakr et al., "A Survey of Large Scale Data Management Approaches in Cloud Environments", IEEE Communications Surveys & Tutorials, Accepted for Publication, 2011, 26 pages.
Sarin et al., "Discarding Obsolete Information in a Replicated Database System", IEEE Transactions on Software Engineering, vol. SE-13, No. 1, Jan. 1987, 9 pages.

* cited by examiner

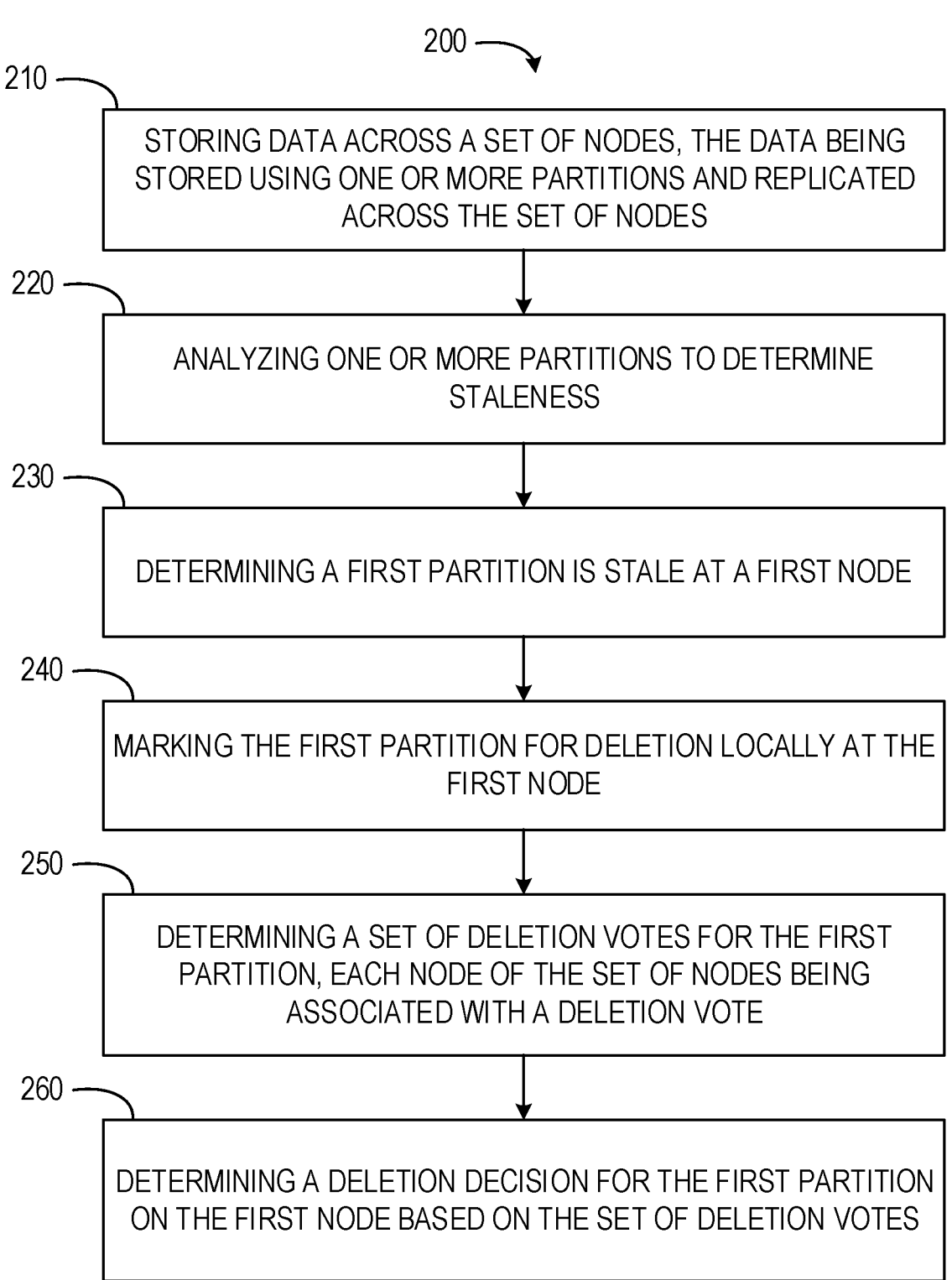

200

210 — STORING DATA ACROSS A SET OF NODES, THE DATA BEING STORED USING ONE OR MORE PARTITIONS AND REPLICATED ACROSS THE SET OF NODES

220 — ANALYZING ONE OR MORE PARTITIONS TO DETERMINE STALENESS

230 — DETERMINING A FIRST PARTITION IS STALE AT A FIRST NODE

240 — MARKING THE FIRST PARTITION FOR DELETION LOCALLY AT THE FIRST NODE

250 — DETERMINING A SET OF DELETION VOTES FOR THE FIRST PARTITION, EACH NODE OF THE SET OF NODES BEING ASSOCIATED WITH A DELETION VOTE

260 — DETERMINING A DELETION DECISION FOR THE FIRST PARTITION ON THE FIRST NODE BASED ON THE SET OF DELETION VOTES

310
IDENTIFYING A SET OF ACCESS METRICS FOR A FIRST PARTITION

320
DETERMINING A FRESHNESS VALUE FOR THE FIRST PARTITION BASED ON THE SET OF ACCESS METRICS

330
COMPARING THE FRESHNESS VALUE FOR THE FIRST PARTITION WITH A FRESHNESS THRESHOLD

GARBAGE COLLECTION OF REDUNDANT PARTITIONS

BACKGROUND

Data replication and partitioning mechanisms are used in broader data management systems. Data partitioning and data replication are often static and defined a priori. Data management systems use varying garbage collection mechanisms to remove data and free storage space for new data. Some data management systems perform garbage collection operations based on detecting no dependencies exist for data across applications. Some data management systems perform garbage collection based on data being unused. Some data management systems may be elastic systems that create new virtual machines as a workload increases for the data management system to perform data replication, partitioning, and distribution. These new machines often bootstrap and receive copies or replicas of data through a replication mechanism or by caching data blocks. These new machines may proxy an associated client. Proxying clients can lead to information loss as the new machines are removed following a workload spike leading to creation of the new machines.

SUMMARY

According to an embodiment described herein, a computer-implemented method for garbage collection of redundant partitions in distributed data management systems is provided. The method stores data across a set of nodes with the data being stored using one or more partitions, and the data and the one or more partitions are replicated across the set of nodes. A first partition is determined to be stale at a first node of the set of nodes. The first partition is marked for deletion locally at the first node. A set of deletion votes are determined for the first partition with each node being associated with a deletion vote. The method determines a deletion decision for the first partition on the first node based on the set of deletion votes.

According to an embodiment described herein, a system for garbage collection of redundant partitions in distributed data management systems is provided. The system includes one or more processors and a computer-readable storage medium, coupled to the one or more processors, storing program instructions that, when executed by the one or more processors, cause the one or more processors to perform operations. The operations store data across a set of nodes with the data being stored using one or more partitions and the data and the one or more partitions are replicated across the set of nodes. A first partition is determined to be stale at a first node of the set of nodes. The first partition is marked for deletion locally at the first node. A set of deletion votes are determined for the first partition with each node being associated with a deletion vote. The operations determine a deletion decision for the first partition on the first node based on the set of deletion votes.

According to an embodiment described herein, a computer program product for garbage collection of redundant partitions in distributed data management systems is provided. The computer program product includes a computer-readable storage medium having program instructions embodied therewith, the program instructions being executable by one or more processors to cause the one or more processors to store data across a set of nodes with the data being stored using one or more partitions and the data and the one or more partitions are replicated across the set of nodes. A first partition is determined to be stale at a first node of the set of nodes. The first partition is marked for deletion locally at the first node. A set of deletion votes are determined for the first partition with each node being associated with a deletion vote. The computer program product determines a deletion decision for the first partition on the first node based on the set of deletion votes.

BRIEF DESCRIPTION OF THE DRAWINGS

FIG. 2 depicts a flow diagram of a computer-implemented method for garbage collection of redundant partitions, according to at least one embodiment.

DETAILED DESCRIPTION

Figure 1:
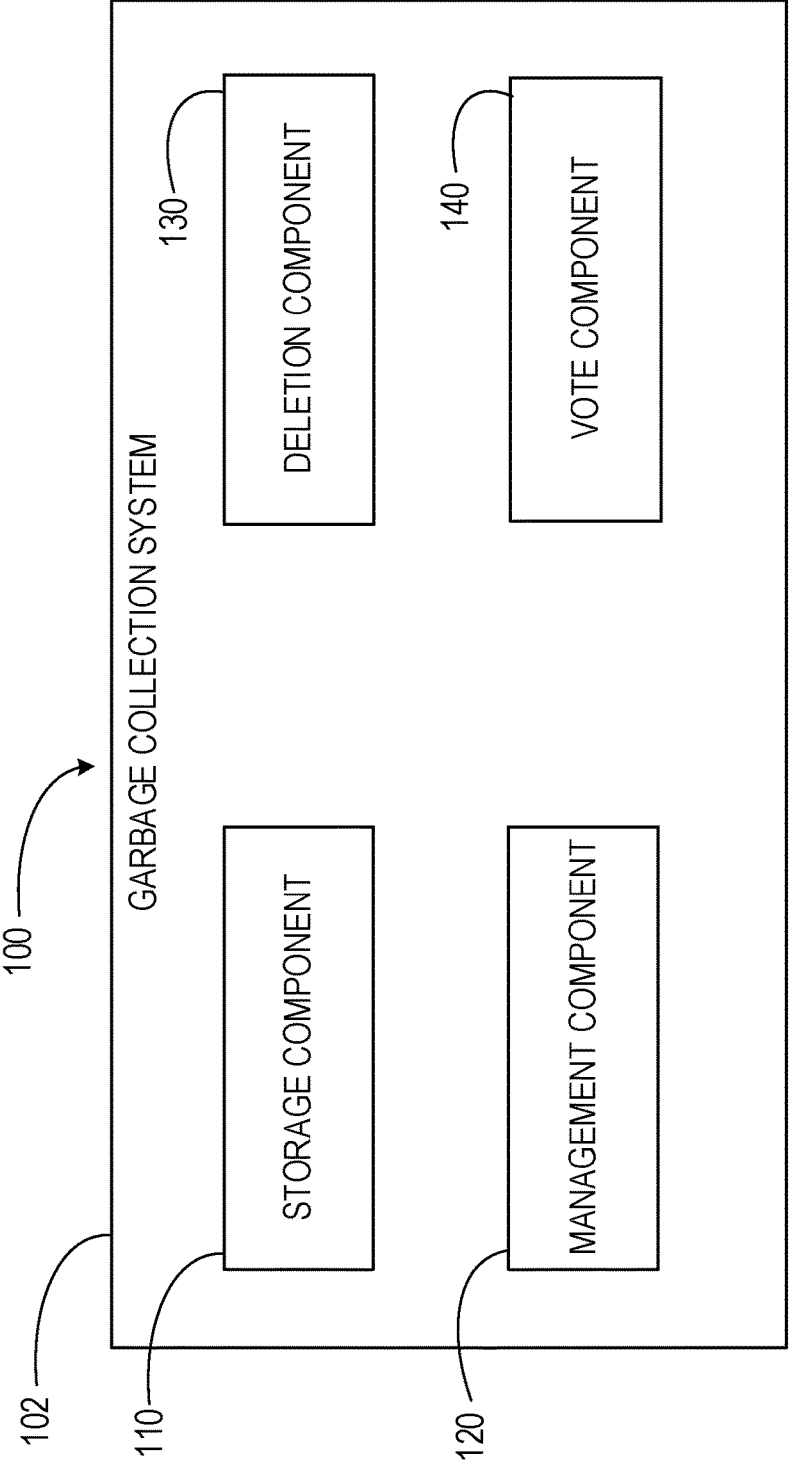
FIG. 1 depicts a block diagram of a computing environment for implementing concepts and computer-based methods, according to at least one embodiment.

The present disclosure relates generally to methods for garbage collection of redundant data. More particularly, but not exclusively, embodiments of the present disclosure relate to a computer-implemented method for garbage collection of redundant partitions in distributed data management systems. The present disclosure relates further to a related system for garbage collection of redundant data, and a computer program product for operating such a system.

Data replication and partitioning mechanisms are used in broader data management systems. Data management systems use varying garbage collection mechanisms to remove data and free storage space for new data. Data partitioning and data replication are often static and defined a priori. Static or a priori definitions for data partitioning and replication present difficulties for some data management systems in evolving as data or data usage changes. Data partitioning in distributed data management systems present difficulties for current systems due to uncertainty regarding optimal partitions and types of query/analytics that are executed on a given dataset.

Some data management systems use traditional garbage collection operations on memory allocated to virtual machines in distributed settings. Some data management systems perform garbage collection operations based on detecting no dependencies exist for data across applications. Some data management systems perform garbage collection based on data being unused. Current data management systems may dynamically scale in response to changes in workload. However, garbage collection mechanisms often fail to respond to dynamic changes in workload and number of virtual machines. Lack of dynamic response in garbage collection mechanisms may lead to loss of information due to changes in workload while attempting to optimize data storage in a distributed data management system. Further, current garbage collection mechanisms often fail to delete unwanted replicas of data in a manner that corresponds to proper allocation and distribution mechanisms.

Embodiments of the present disclosure enable garbage collection functionality in data management systems that are organized around keys and values and consist of multiple interlinked datasets stored across multiple physical or virtual computing systems. Some embodiments of the present disclosure enable garbage collection mechanisms capable of cleaning unwanted or unused data partitions in data management systems which dynamically create and remove new partitions to respond to changes in workload and conserve resource usage. Embodiments of the present disclosure enable garbage collection of unwanted partitions and decommissioning excess cloud infrastructure to save cloud computing resources. Some embodiments of the present disclosure provide a decentralized garbage collection mechanism drive by workload-aware intelligent resource management systems. Embodiments of the present disclosure prevent information loss of dynamically allocated virtual machines by using garbage collection mechanisms that remove data replicas failing to satisfy selected criteria and remove unnecessary nodes to reduce unwanted cost and data utilization in distributed data management systems.

Some embodiments of the concepts described herein may take the form of a system or a computer program product. For example, a computer program product may store program instructions that, when executed by one or more processors of a computing system, cause the computing system to perform operations described above with respect to the computer-implemented method. By way of further example, the system may comprise components, such as processors and computer-readable storage media. The computer-readable storage media may interact with other components of the system to cause the system to execute program instructions comprising operations of the computer-implemented method, described herein. For the purpose of this description, a computer-usable or computer-readable medium may be any apparatus that may contain means for storing, communicating, propagating, or transporting the program for use, by, or in connection with, the instruction execution system, apparatus, or device.

Referring now to FIG. 1, a block diagram of an example computing environment 100 is shown. The present disclosure may be implemented within the example computing environment 100. In some embodiments, the computing environment 100 may be included within or embodied by a computer system, described below (see FIG. 4). The computing environment 100 may include a garbage collection system 102. The garbage collection system 102 may comprise a storage component 110, a management component 120, a deletion component 130, and a vote component 140. The storage component 110 stores and replicates data across a set of nodes. The management component 120 analyzes partition staleness and generates freshness values. The deletion component 130 marks partitions for deletion and deletes partitions based on deletion votes. The vote component 140 coordinates deletion votes among nodes and determines deletion vote outcomes. Although described with distinct components, it should be understood that, in at least some embodiments, components may be combined or divided, and/or additional components may be added without departing from the scope of the present disclosure.

Referring now to FIG. 2, a flow diagram of a computer-implemented method 200 is shown. The computer-implemented method 200 is a method for garbage collection of redundant partitions. In some embodiments, the computer-implemented method 200 may be performed by one or more components of the computing environment 100, as described in more detail below.

At operation 210, the storage component 110 stores data across a set of nodes. In some embodiments, the data is redundant data. The redundant data is stored on a plurality of nodes. In some embodiments, the data is stored using one or more partitions. The data and the one or more partitions are replicated across the set of nodes. The storage component 110 may store data across the set of nodes in a peer-to-peer distributed data management system. The distributed data management system may provide autoscaling to dynamically increase a number of nodes able to store data and respond to queries. The distributed data management system may enable users to connect to any node of the set of nodes to perform queries.

The storage component 110 may store the data in partitions replicated across multiple nodes of the set of nodes. The storage component 110 may maintain a minimum number of replica partitions. In such instances, the storage component 110 may maintain data despite a portion of nodes being powered down or removed. Each node may retrieve data or partitions from other nodes when data within a query is not stored locally. Partitions stored on a node may be subject to staleness or issues which indicate that the partition is unwanted, unused, compromised, or corrupted on a given node.

At operation 220, the management component 120 analyzes one or more partitions to determine staleness. In some embodiments, each partition of the one or more partitions is analyzed by a management component 120 of a node at which the partition is stored locally. The management component 120 may analyze staleness based on one or more conditions, attributes, or statistical information associated with each partition. The conditions, attributes, or statistical information for each partition may be updated upon execution of each query associated with that partition. For example, cached partitions may be dirty or modified after having been altered by a query. Cached partitions may receive multiple hits from queries within a given period of time. Cached partitions may be temporarily stored or mirrored on one node after a query to that node which caused the node to access the partition stored on another node. In some embodiments, the management component 120 analyzes conditions including statistical information about data partition usage, access counts, last access time, query alteration, replication of data of the partition to other nodes, node from which a cached partition originated, combinations thereof, and other relevant characteristics, conditions, or attributes associated with the partition or access of the partition.

In some embodiments, the management component 120 computes a freshness value for each partition. In some instances, a version of the management component 120 implemented on a node computes freshness values for each partition stored on that node. The freshness value may be a function of usage statistics, conditions, or attributes of the partition. In some instances, the freshness value is calculated as an exponential decay of access counts over time since a last access of the partition.

The management component 120, or a management component 120 implemented at each node, may periodically verify partition freshness or staleness. In some instances, the management component 120 performs staleness verifications at a set time, a time frame, a usage or workload, at random intervals, or any other suitable metric. In determining staleness of a given partition, the management component 120 may determine the partition is not dirty, the data is not being replicated to other nodes, and that the data partition has a freshness value over a specified threshold.

At operation 230, the management component 120 determines a first partition is stale. The first partition may be a partition comprising data stored at a first node of the set of nodes. In some embodiments, the management component 120 determines the first partition is stale by comparing a freshness value for the first partition with a freshness threshold. The management component 120 may determine the first partition is stale where the freshness value of the first partition is below the freshness threshold.

At operation 240, the deletion component 130 marks the first partition for deletion. In some embodiments, the first partition is marked for deletion locally at the first node. The deletion component 130 may mark the first partition for deletion in a hash table, database table, or other data structure associated the first partition or configured to allocate or identify memory space for the first partition. In some instances, the deletion component 130 marks the first partition for deletion in a data structure internal to the deletion component 130.

At operation 250, the vote component 140 determines a set of deletion votes for the first partition. In some embodiments, each node of the set of nodes is associated with a deletion vote of the set of deletion votes. The vote component 140 may determine the set of deletion votes by initiating a deletion vote for the first partition and receiving a deletion vote from the set of nodes other than the first node.

In some embodiments, the vote component 140 determines the set of deletion votes by transmitting a deletion indicator from the first node to a remaining subset of nodes of the set of nodes. In some embodiments, the deletion indicator is transmitted from the first node to the other nodes of the set of nodes as a partition identifier for the first partition, a node identifier for the node on which the first partition is stored, and a deletion identifier indicating that the first partition is a candidate for deletion. In some embodiments, the vote component 140 transmits the freshness value of the first partition as part of the deletion indicator or in addition to the deletion indicator.

The vote component 140 receives the set of deletion votes from the remaining subset of nodes. In some embodiments, each node of the remaining subset of nodes compares the freshness value for the first partition to a freshness value for a local partition. The local partition may be associated with the first partition. For example, the local partition may be a mirror or local version of the first partition. In such instances, each node compares the freshness value of the first node with a locally stored version of the first partition on that node. The subset of nodes may provide deletion nodes as positive (e.g., yes) for deletion or negative (e.g., no) for not deleting the first partition. For example, a node may respond to a deletion indicator with a "no" vote where a local replica of the partition has a higher freshness value or is otherwise less stale. By way of further example, a node may respond to a deletion indicator with a "yes" vote where a local replica of the partition has a lower freshness value or is otherwise more stale than the first partition.

At operation 260, the vote component 140 determines a deletion decision for the first partition on the first node. The deletion decision is based on the set of deletion votes. The deletion decision may be a positive decision or a negative decision. A positive deletion decision may be a decision indicating deletion of the first partition. A negative deletion decision may be a decision indicating the first partition is not to be deleted.

In some embodiments, the vote component 140 determines the deletion decision is a positive deletion decision by determining a threshold number of nodes of the set of nodes are associated with a positive deletion vote. The threshold number of nodes (e.g., a delete threshold) may be a simple majority. In some instances, the vote threshold is a function of positive deletion votes and an aggregate staleness of replica partitions. For example, the vote component 140 may receive a threshold number of "yes" votes from nodes of the set of nodes.

In such instances, in response to determining the positive deletion decision, the deletion component 130 deletes the first partition from the first node. The deletion component 130 may actively delete the first partition from the first node. For example, upon receiving the positive vote from the vote component 140 the deletion component 130 may remove the first partition from memory. The deletion component 130 may also passively delete the first partition from the first node. For example, upon receiving the positive vote from the vote component 140 the deletion component 130 may mark the first partition as deleted in a hash table, database table, or other data structure associated the first partition. Once the deletion component 130 marks the first partition as being deleted, other data may subsequently be written to a memory address formerly associated with the first partition.

In some embodiments, the vote component 140 determines the deletion decision is a negative deletion decision by determining a number of nodes associated with a positive deletion vote is below a deletion threshold. The vote component 140 may determine the deletion decision is negative by determining the number of "yes" votes falls below the deletion threshold. In some instances, the vote component 140 determines the deletion decision is negative by determining a number of "no" votes exceeds a vote threshold (e.g., a keep threshold).

In such instances, in response to determining the negative deletion decision, the deletion component 130 reverts the deletion marking of the first partition on the first node. Once the deletion marking is reverted, the first partition is not deleted from the first node.

In some instances, the vote component 140 determines a conflict in the deletion decision. In some instances, a conflict in the deletion decision may arise where a number of "yes" and "no" votes are the same. In some instances, a conflict in the deletion decision may arise where a freshness value or staleness of the first partition is suitable for deletion but the same values for a replica partition on another node are not suitable for deletion. In some embodiments, the vote component 140 determines a conflict in network partitioning for the first partition. The vote component 140 may use a consensus mechanism to solve the conflict in the deletion decision or network partitioning. For example, the vote component 140 may solve the conflict or network partitioning using a Paxos protocol for consensus or using a Raft consensus algorithm.

Figure 3:
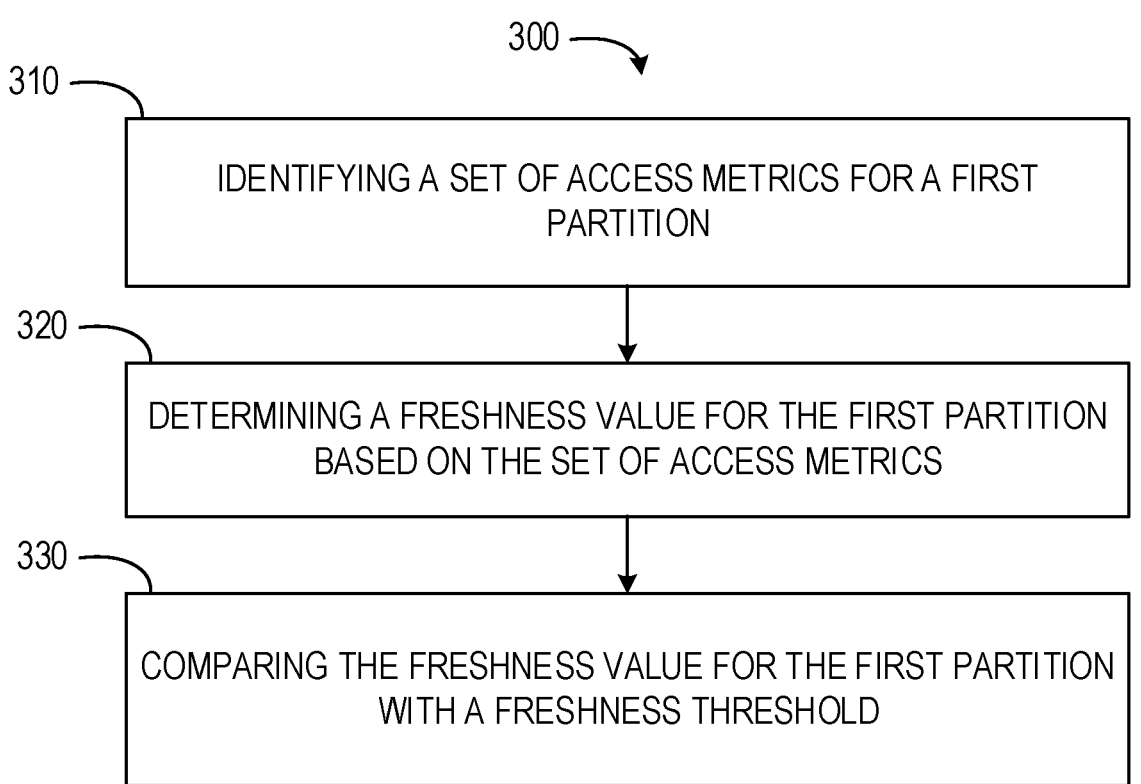
FIG. 3 depicts a flow diagram of a computer-implemented method for garbage collection of redundant partitions, according to at least one embodiment.

FIG. 3 shows a flow diagram of an embodiment of a computer-implemented method 300 for garbage collection of redundant partitions. The method 300 may be performed by or within the computing environment 100. In some embodiments, the method 300 comprises or incorporates one or more operations of the method 200. In some instances, operations of the method 300 may be incorporated as part of or sub-operations of the method 200.

In operation 310, the management component 120 identifies a set of access metrics for a first partition. The access metrics may include requests or queries for the first partition, requests or queries for the first partition within a specified time period, hits per time period, usage statistics, access counts, last access time, query alteration, replication of data of the first partition to other nodes, number of nodes to which the first partition is cached, combinations thereof, or any other suitable access metrics.

In operation 320, the management component 120 determines a freshness value for the first partition based on the set of access metrics. The freshness value may be determined by computing a function of usage statistics, conditions, or attributes of the first partition. The freshness value may be calculated as an exponential decay of access counts, access counts over time, access counts since a last access of the first partition, access counts of the first partition or replicas of the first partition on other nodes, combinations thereof, or calculations based on any other suitable access metric or set of access metrics.

In operation 330, the management component 120 compares the freshness value for the first partition with a freshness threshold. The management component 120 may compare the freshness value of the first partition with a freshness threshold as a direct comparison of the freshness value to a predetermined freshness threshold value. In some embodiments, the freshness threshold may be dynamically generated based on usage statistics as a dynamic threshold. The dynamic threshold may reflect freshness based on access metrics relevant to the set of nodes associated with the first node and the first partition. The management component 120 may then compare the freshness value to the dynamic threshold.

Figure 4:
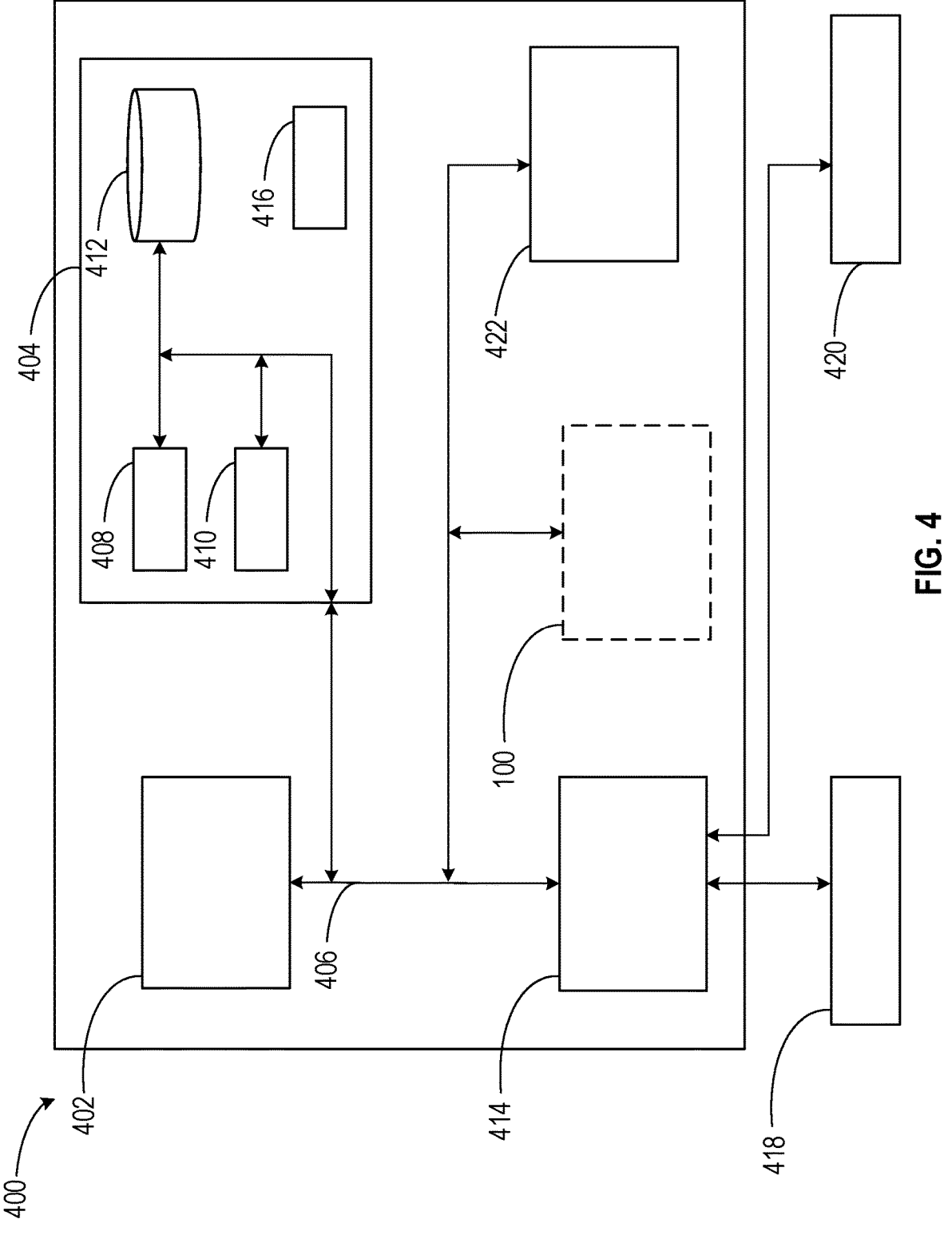
FIG. 4 depicts a block diagram of a computing system for garbage collection of redundant partitions, according to at least one embodiment.

Embodiments of the present disclosure may be implemented together with virtually any type of computer, regardless of the platform is suitable for storing and/or executing program code. FIG. 4 shows, as an example, a computing system 400 (e.g., cloud computing system) suitable for executing program code related to the methods disclosed herein and for garbage collection of redundant partitions.

The computing system 400 is only one example of a suitable computer system and is not intended to suggest any limitation as to the scope of use or functionality of embodiments of the present disclosure described herein, regardless, whether the computer system 400 is capable of being implemented and/or performing any of the functionality set forth hereinabove. In the computer system 400, there are components, which are operational with numerous other general purpose or special purpose computing system environments or configurations. Examples of well-known computing systems, environments, and/or configurations that may be suitable for use with computer system/server 400 include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like. Computer system/server 400 may be described in the general context of computer system-executable instructions, such as program modules, being executed by a computer system 400. Generally, program modules may include routines, programs, objects, components, logic, data structures, and so on that perform particular tasks or implement particular abstract data types. Computer system/server 400 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 400 is shown in the form of a general-purpose computing device. The components of computer system/server 400 may include, but are not limited to, one or more processors 402 (e.g., processing units), a system memory 404 (e.g., a computer-readable storage medium coupled to the one or more processors), and a bus 406 that couple various system components including system memory 404 to the processor 402. Bus 406 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 400 typically includes a variety of computer system readable media. Such media may be any available media that is accessible by computer system/server 400, and it includes both, volatile and non-volatile media, removable and non-removable media.

The system memory 404 may include computer system readable media in the form of volatile memory, such as random-access memory (RAM) 408 and/or cache memory 410. Computer system/server 400 may further include other removable/non-removable, volatile/non-volatile computer system storage media. By way of example only, a storage system 412 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 406 by one or more data media interfaces. As will be further depicted and described below, the system memory 404 may include at least one program product having a set (e.g., at least one) of program modules that are configured to carry out the functions of embodiments of the present disclosure.

The program/utility, having a set (at least one) of program modules 416, may be stored in the system memory 404 by way of example, and not limiting, as well as an operating system, one or more application programs, other program modules, and program data. Program modules may include one or more of the storage component 110, the management component 120, the deletion component 130, and the vote component 140, which are illustrated in FIG. 1. Each of the operating systems, one or more application programs, other program modules, and program data or some combination thereof, may include an implementation of a networking environment. Program modules 416 generally carry out the functions and/or methodologies of embodiments of the present disclosure, as described herein.

The computer system/server 400 may also communicate with one or more external devices 418 such as a keyboard, a pointing device, a display 420, etc.; one or more devices that enable a user to interact with computer system/server 400; and/or any devices (e.g., network card, modem, etc.) that enable computer system/server 400 to communicate with one or more other computing devices. Such communication can occur via Input/Output (I/O) interfaces 414. Still yet, computer system/server 400 may communicate with one or more networks such as a local area network (LAN), a general wide area network (WAN), and/or a public network (e.g., the Internet) via network adapter 422. As depicted, network adapter 422 may communicate with the other components of computer system/server 400 via bus 406. It should be understood that, although not shown, other hardware and/or software components could be used in conjunction with computer system/server 400. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Service models may include software as a service (SaaS), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models may include private cloud, community cloud, public cloud, and hybrid cloud. In private cloud, the cloud infrastructure is operated solely for an organization. It may be managed by the organization or a third party and may exist on-premises or off-premises. In community cloud, the cloud infrastructure is shared by several organizations and supports specific community that has shared concerns (e.g., mission, security requirements, policy, and compliance considerations). It may be managed by the organizations or a third party that may exist on-premises or off-premises. In public cloud, the cloud infrastructure is made available to the general public or a large industry group and is owned by an organization selling cloud services. In hybrid cloud, the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling modularity, and semantic interoperability. At the heart of cloud computing is an infrastructure that includes a network of interconnected nodes.

Figure 5:
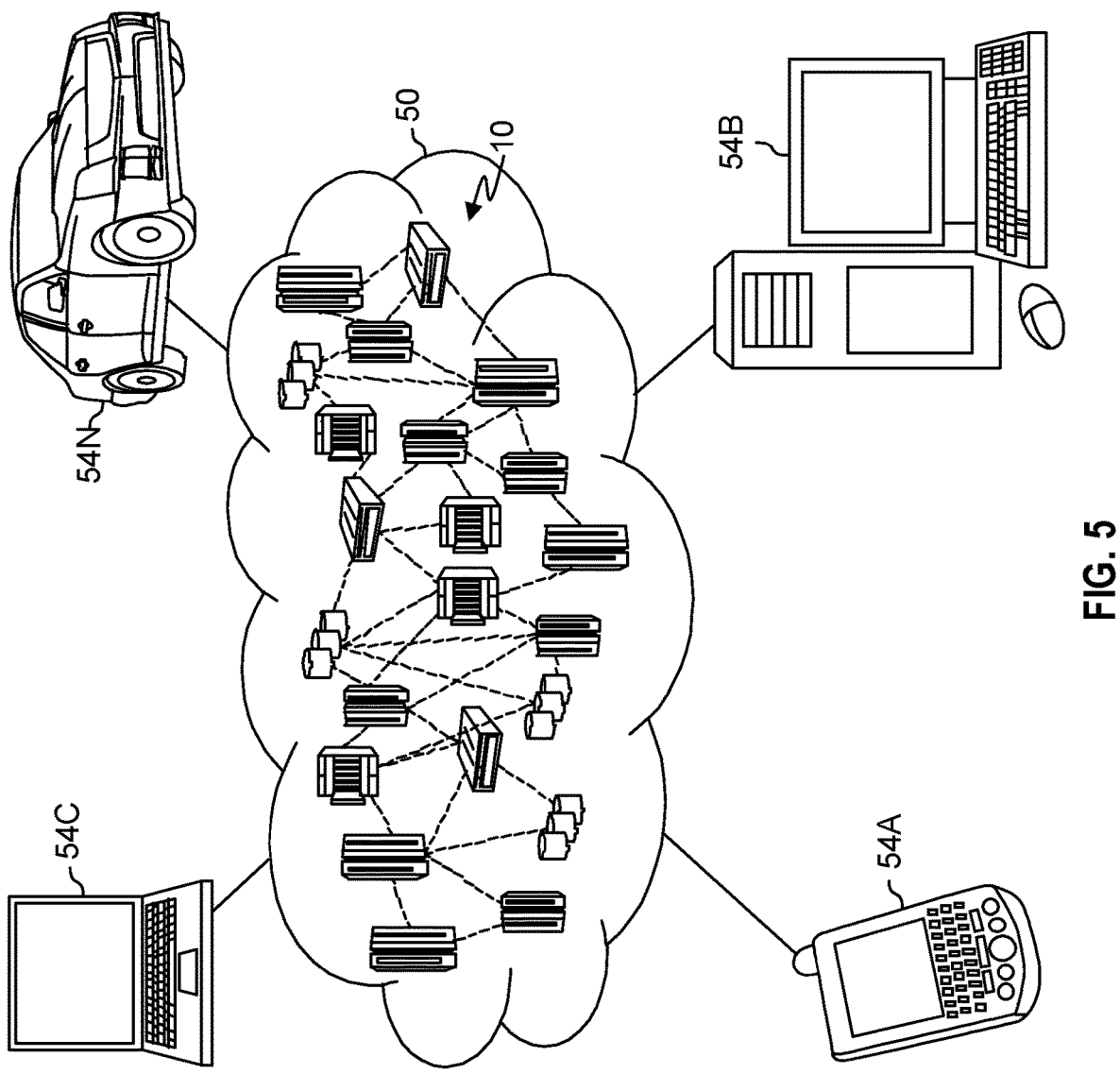
FIG. 5 is a schematic diagram of a cloud computing environment in which concepts of the present disclosure may be implemented, in accordance with an embodiment of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
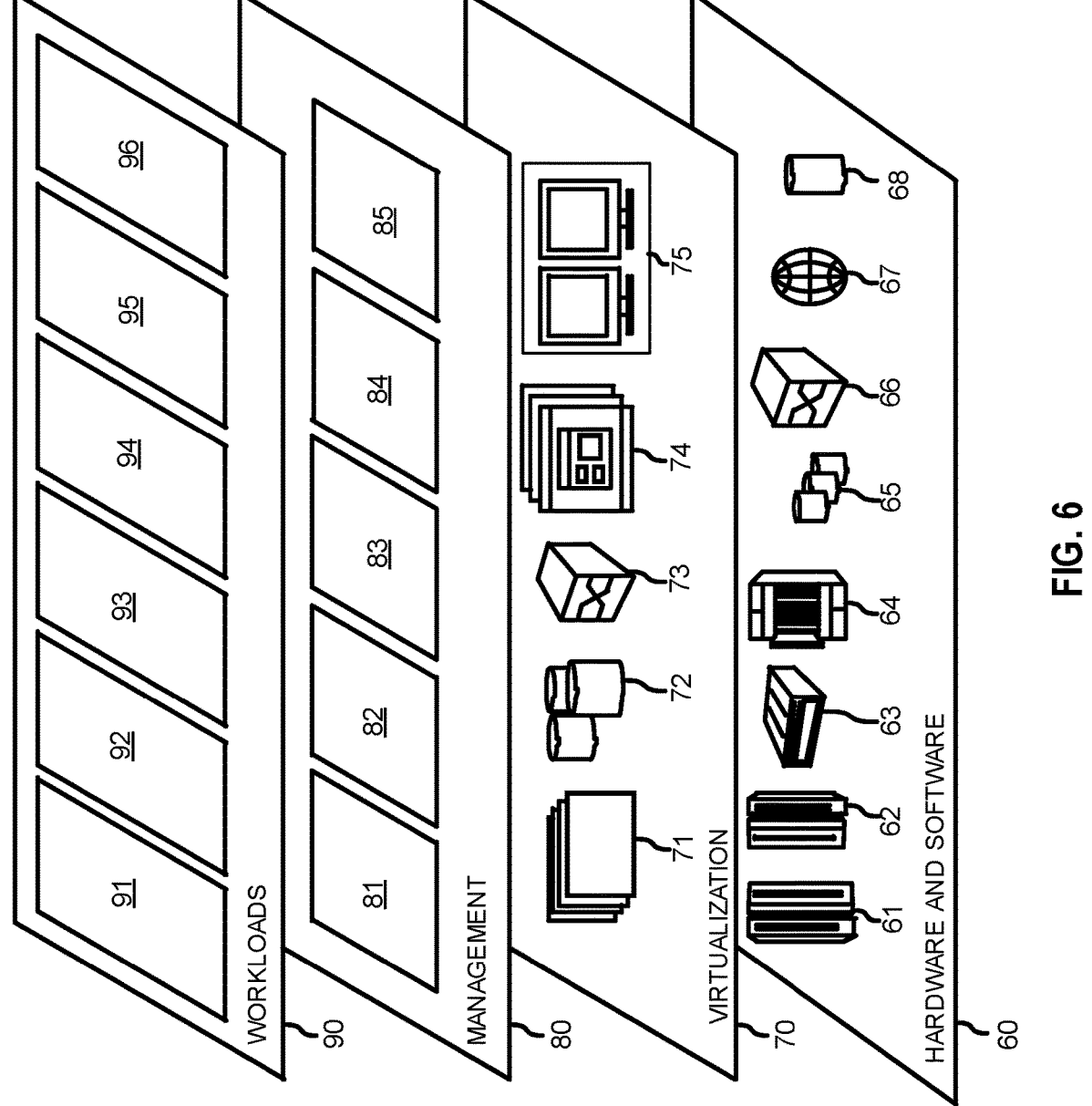
FIG. 6 is a diagram of model layers of a cloud computing environment in which concepts of the present disclosure may be implemented, in accordance with an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cognitive garbage collection processing 96.

Cloud models may include characteristics including on-demand self-service, broad network access, resource pooling, rapid elasticity, and measured service. In on-demand self-service a cloud consumer may unilaterally provision computing capabilities such as server time and network storage, as needed automatically without requiring human interaction with the service's provider. In broad network access, capabilities are available over a network and accessed through standard mechanisms that promote use by heterogeneous thin or thick client platforms (e.g., mobile phones, laptops, and PDAs). In resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). In rapid elasticity, capabilities can be rapidly and elastically provisioned, in some cases automatically, to quickly scale out and rapidly released to quickly scale in. To the consumer, the capabilities available for provisioning often appear to be unlimited and can be purchased in any quantity at any time. In measured service, cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for garbage collection of redundant partitions in distributed data management systems, the method comprising:

storing data across a set of nodes in the distributed data management systems, the data being stored using one or more partitions and the data and the one or more partitions being replicated across the set of nodes;

determining, at a first node of the set of nodes, a first partition is stale by identifying a set of access metrics for the first partition, wherein the first partition includes data stored at the first node of the set of nodes, determining a freshness value for the first partition based on the set of access metrics, wherein the freshness value is determined by computing a function of usage statistics of the first partition, conditions of the first partition, or attributes of the first partition, wherein the freshness value selected from a group consisting of an exponential decay of access counts, access counts over time, access counts since a last access of the first partition, access counts of the first partition, and replicas of the first partition on other nodes, and comparing the freshness value for the first partition with a freshness threshold, wherein the freshness threshold is dynamically generated based on the usage statistics;

marking the first partition for deletion, the first partition being marked for deletion locally at the first node;

determining a set of deletion votes for the first partition, each node of the set of nodes being associated with a deletion vote of the set of deletion votes, wherein the determining the set of deletion votes further comprises:

transmitting a deletion indicator from the first node to a remaining subset of nodes of the set of nodes; and receiving the set of deletion votes from the remaining subset of nodes, each node of the remaining subset of nodes comparing the freshness value for the first partition to a freshness value for a local partition associated with the first partition; and determining a deletion decision for the first partition on the first node based on the set of deletion votes.

2. The method of claim 1, wherein the determining the deletion decision further comprises:

determining a threshold number of nodes of the set of nodes are associated with a positive deletion vote; and deleting the first partition from the first node.

3. The method of claim 1, wherein the determining the deletion decision further comprises:

determining a number of nodes associated with a positive deletion vote is below a deletion threshold; and reverting a deletion marking for the first partition on the first node.

4. The method of claim 1, further comprising:

analyzing, by each node of the set of nodes, the one or more partitions stored locally on the first node to determine staleness of the one or more partitions.

5. The method of claim 1, wherein the set of access metrics includes requests or queries for the first partition, requests or queries for the first partition within a specified time period, hits per time period, the usage statistics, access counts, last access time, query alteration, replication of data of the first partition to other nodes, and number of nodes to which the first partition is cached.

6. A system for garbage collection of redundant partitions in distributed data management systems, the system comprising:

one or more processors; and a computer-readable storage medium, coupled to the one or more processors, storing program instructions that, when executed by the one or more processors, cause the one or more processors to perform operations comprising:

storing data across a set of nodes in the distributed data management systems, the data being stored using one or more partitions and the data and the one or more partitions being replicated across the set of nodes;

determining, at a first node of the set of nodes, a first partition is stale by identifying a set of access metrics for the first partition, wherein the first partition includes data stored at the first node of the set of nodes, determining a freshness value for the first partition based on the set of access metrics, wherein the freshness value is determined by computing a function of usage statistics of the first partition, conditions of the first partition, or attributes of the first partition, wherein the freshness value is selected from a group consisting of an exponential decay of access counts, access counts over time, access counts since a last access of the first partition, access counts of the first partition, and replicas of the first partition on other nodes, and comparing the freshness value for the first partition with a freshness threshold, wherein the freshness threshold is dynamically generated based on the usage statistics;

marking the first partition for deletion, the first partition being marked for deletion locally at the first node;

determining a set of deletion votes for the first partition, each node of the set of nodes being associated with a deletion vote of the set of deletion votes, wherein the determining the set of deletion votes further comprises:

transmitting a deletion indicator from the first node to a remaining subset of nodes of the set of nodes; and receiving the set of deletion votes from the remaining subset of nodes, each node of the remaining subset of nodes comparing the freshness value for the first partition to a freshness value for a local partition associated with the first partition; and determining a deletion decision for the first partition on the first node based on the set of deletion votes.

7. The system of claim 6, wherein the determining the deletion decision further comprises:

determining a threshold number of nodes of the set of nodes are associated with a positive deletion vote; and deleting the first partition from the first node.

8. The system of claim 6, wherein the determining the deletion decision further comprises:

determining a number of nodes associated with a positive deletion vote is below a deletion threshold; and reverting a deletion marking for the first partition on the first node.

9. The system of claim 6, wherein the operations further comprise:

analyzing, by each node of the set of nodes, the one or more partitions stored locally on the first node to determine staleness of the one or more partitions.

10. The system of claim 6, wherein the set of access metrics includes requests or queries for the first partition, requests or queries for the first partition within a specified time period, hits per time period, the usage statistics, access counts, last access time, query alteration, replication of data of the first partition to other nodes, and number of nodes to which the first partition is cached.

11. A computer program product for garbage collection of redundant partitions in distributed data management systems comprising a computer readable storage medium having program instructions embodied therewith, the program instructions being executable by one or more processors to cause the one or more processors to perform operations comprising:

storing data across a set of nodes in the distributed data management systems, the data being stored using one or more partitions and the data and the one or more partitions being replicated across the set of nodes;

determining, at a first node of the set of nodes, a first partition is stale by identifying a set of access metrics for the first partition, wherein the first partition includes data stored at the first node of the set of nodes, determining a freshness value for the first partition based on the set of access metrics, wherein the freshness value is determined by computing a function of usage statistics of the first partition, conditions of the first partition, or attributes of the first partition, wherein the freshness value is selected from a group consisting of an exponential decay of access counts, access counts over time, access counts since a last access of the first partition, access counts of the first partition, and replicas of the first partition on other nodes, and comparing the freshness value for the first partition with a freshness threshold, wherein the freshness threshold is dynamically generated based on the usage statistics;

marking the first partition for deletion, the first partition being marked for deletion locally at the first node;

determining a set of deletion votes for the first partition, each node of the set of nodes being associated with a deletion vote of the set of deletion votes, wherein the determining the set of deletion votes further comprises:

transmitting a deletion indicator from the first node to a remaining subset of nodes of the set of nodes; and receiving the set of deletion votes from the remaining subset of nodes, each node of the remaining subset of nodes comparing the freshness value for the first partition to a freshness value for a local partition associated with the first partition; and determining a deletion decision for the first partition on the first node based on the set of deletion votes.

12. The computer program product of claim 11, wherein the determining the deletion decision comprises:

determining a threshold number of nodes of the set of nodes are associated with a positive deletion vote; and deleting the first partition from the first node.

13. The computer program product of claim 11, wherein the determining the deletion decision comprises:

determining a number of nodes associated with a positive deletion vote is below a deletion threshold; and reverting a deletion marking for the first partition on the first node.

14. The computer program product of claim 11, wherein the operations further comprise:

analyzing, by each node of the set of nodes, the one or more partitions stored locally on the first node to determine staleness of the one or more partitions.

15. The computer program product of claim 11, wherein the set of access metrics includes requests or queries for the first partition, requests or queries for the first partition within a specified time period, hits per time period, the usage statistics, access counts, last access time, query alteration, replication of data of the first partition to other nodes, and number of nodes to which the first partition is cached.

\*  \*  \*  \*  \*